United States Patent [19]

Miyazaki et al.

[11] Patent Number: 4,981,614

[45] Date of Patent: Jan. 1, 1991

[54] SOLID SOLUTION

[75] Inventors: Takeshi Miyazaki, Ebina; Seizo Miyata, Hoya, both of Japan

[73] Assignee: Canon Kabushiki Kaisha, Tokyo, Japan

[21] Appl. No.: 245,643

[22] Filed: Sep. 16, 1988

[30] Foreign Application Priority Data

Sep. 21, 1987 [JP] Japan .............................. 62-234950
Jan. 25, 1988 [JP] Japan .............................. 63-012575
Jul. 28, 1988 [JP] Japan .............................. 63-186752

[51] Int. Cl.⁵ ........................... F21V 9/04; G02B 6/10
[52] U.S. Cl. .................................... 252/587; 252/582; 350/96.12; 350/96.14; 350/96.3; 350/355
[58] Field of Search ............... 252/582, 583, 589, 600, 252/587, 299.5; 350/96.12, 96.14, 96.3, 355

[56] References Cited

U.S. PATENT DOCUMENTS

| | | | |
|---|---|---|---|
| 3,644,264 | 2/1972 | Hyde | 260/30.2 R |
| 3,726,830 | 4/1973 | Heuser et al. | 260/45.8 A |
| 3,931,068 | 1/1976 | Clendinning et al. | 260/7.5 |
| 4,215,010 | 7/1980 | Hovey et al. | 252/584 |
| 4,342,668 | 8/1982 | Hovey et al. | 252/586 |
| 4,367,170 | 1/1983 | Uhlmann et al. | 252/586 |
| 4,428,873 | 1/1984 | Murayama et al. | 252/583 |
| 4,456,715 | 6/1984 | Rottmaier et al. | 524/100 |
| 4,627,997 | 12/1986 | Ide | 428/216 |
| 4,717,508 | 1/1988 | DeMartino | 252/583 |
| 4,719,296 | 1/1988 | Irie et al. | 544/71 |
| 4,748,074 | 5/1988 | Pantelis et al. | 428/220 |

FOREIGN PATENT DOCUMENTS

| | | | |
|---|---|---|---|
| 0186999 | 7/1986 | European Pat. Off. | 252/587 |
| 256983 | 2/1988 | European Pat. Off. | |
| 2165850 | 4/1986 | United Kingdom | 524/100 |

OTHER PUBLICATIONS

Singer, K. D. et al., Appl. Phys. Lett. 49, 248, 1986.
The Merck Index, Merck & Co. Inc., Rahway N.J., 1983.
Advanced Org. Chemistry, March, J. Wiley & Sons, New York, 1985.
Chemical Abstracts, vol. 112, No. 4, 1989, Abstract No. 27359s.
Chemical Abstracts, vol. 107, No. 12, 1987, Abstract No. 105716u.
Chemical Abstracts, vol. 106, No. 6, 1986, Abstract No. 41111n.
Chemical Abstracts, vol. 102, No. 14, 1985, Abstract No. 122760t.
Chemical Abstracts, vol. 96, No. 16, 1982, Abstract No. 132854y.

*Primary Examiner*—John S. Maples
*Assistant Examiner*—Richard Treanor
*Attorney, Agent, or Firm*—Fitzpatrick, Cella, Harper & Scinto

[57] ABSTRACT

An organic guest compound having both an electron attractive group and an electron donative group is blended with a host polymer selected from a lactone polymer and a copolymer nylon to form a solid solution. The solid solution shows good mechanical strength and processability and may be suitably formed into a nonlinear optical device. Even if the guest compound is a compound, such as p-nitroaniline, which has a large non-linearity but is by itself liable to form a centrosymmetrical crystal thus showing no SHG activity, the solid solution obtained by blending it with the host polymer can show a uniform and large SHG activity.

37 Claims, 2 Drawing Sheets

SOLID SOLUTION

FIELD OF THE INVENTION AND RELATED ART

The present invention relates to a solid solution useful as a nonlinear optical material of a guest-host type.

Heretofore, as nonlinear optical materials, inorganic single crystals of KDP, $LiNbO_3$, etc., and organic single crystals of urea, etc., have been known and used, e.g., for a wavelength conversion element for laser. However, it is technically difficult to obtain such a single crystal in a large size, and such a single crystal cannot be obtained at a low cost. In view of these problems, it has been tried to obtain a large size of single crystal in the form of a film or fiber through vapor deposition or zone melting in a capillary (Nayay, B. K.; ACS sym., 153 (1983)). By this method, however, it is not easy to control the growth of single crystal in a direction capable of phase matching required for effectively providing second harmonic generation (abbreviated as "SHG") or third harmonic generation (abbreviated as "THG").

Instead of using a single crystal, there has been known a method of adding a guest compound having a large nonlinear optical constant in host molecules and applying an electric or magnetic field for orientation of the mixture in order to control the crystalline structure.

For example, it was tried to use a polymer liquid crystal as a host and polar molecules as a guest and utilize the orientation under an electric field of the polymer liquid crystal to align the polar molecules. As a result, SHG was observed under application of an electric field (Meredith, G. R., et al.; Macromolecules, 15, 1385 (1982)).

Further, as an example of alignment of polar molecules in an amorphous polymer, a polymethyl methacrylate resin with an azo colorant dissolved therein was formed into a film, heated to a temperature above the glass transition point and supplied with a voltage to align the azo colorant molecules, followed further by cooling to fix the resultant structure. As a result, a nonlinear optical constant of $6 \times 10^{-9}$ esu was observed (Singer, K. D., Sohn, J. E. and Lalama, S. J., Appl. Phys. Lett. 49, page 248 (1986)).

It has been also proposed to mix a nonlinear optical-responsive organic compound in a polymer to obtain a polymer nonlinear optical material (U.S. Pat. No. 4,428,873; JP-A (Kokai) 57-45519). A nonlinear optical material comprising an acrylamide resin as a host polymer and a nonlinear optical-responsive organic compound as a guest has been also proposed (JP-A (Kokai) 62-84139). It has been also proposed to cause crystalline growth of a compound having an asymmetric center in a polyoxyalkylene matrix (JP-A 62-246962).

Such a polymer-type nonlinear optical material has an excellent processability into a film, etc., while retaining its electron interaction providing a nonlinear optical effect and is regarded as a suitable material for device formation.

Such a polymer-type nonlinear optical material, however, still involves some problems. Generally, a larger nonlinear optical effect is attained proportionally as the content of a guest compound in a polymer matrix (solid solution) is increased. It is however, difficult to blend a low-molecular weight polar compound as a guest in a large proportion, e.g., at least 15 wt. %, in a polymer uniformly, so that the guest molecules can partially cause phase separation to be crystallized.

Furthermore, such a polymer blend is liable to lose the flexibility of the polymer per se and result in a remarkable decrease in mechanical strength, especially where the content of a low-molecular weight polar guest compound is increased.

Additionally, in a known polymer-type guest-host material, the nonlinear optical effect of a guest molecule is not sufficiently reflected in the nonlinear optical material obtained by mixing the guest molecule in a conventional polymer, even if the guest molecule has a large second order polarization $\beta$ or third order polarization $\gamma$, so that the resultant blend material is expected to show only a low level of nonlinear optical effect.

As for the second order nonlinear optical effect, a guest molecule which per se has a large polarization $\beta$ can show no or only a slight SHG activity when blended in a conventional polymer, if it is a centrosymmetric crystal. For this reason, it has been generally necessary to form the polymer blend into a film and orient the film as by application of an electric or magnetic field or by stretching.

SUMMARY OF THE INVENTION

In view of the problems of the prior art as discussed above an object of the present invention is to provide a novel solid solution suitable as a nonlinear optical material, wherein a nonlinear guest organic compound having a large polarization is easily and uniformly dissolved mutually in a host polymer compound; the second order and third order nonlinear optical effects of the guest organic compound are not lowered by blending with the host polymer compound; a flexibility is retained even if the guest organic compound is contained in a large proportion; and excellent mechanical strength and processability are retained.

Another object of the present invention is to provide a solid solution wherein a guest organic compound having a large polarization $\beta$ but showing no SHG activity because of its crystalline centrosymmetry is blended within a host polymer compound to develop a large SHG activity.

Still another object of the present invention is to provide a display device comprising a film of such a solid solution.

According to the present invention, there is provided a solid solution of an organic guest compound having both an electron attractive group and an electron donative group in a host polymer comprising a lactone polymer or a copolymer nylon.

According to another aspect of the present invention, there is provided a display device comprising a film of the above-mentioned solid solution.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The host polymer used in the present invention comprises at least one of a lactone polymer and a copolymer nylon.

The lactone polymer may be a polymer of a non-substituted or substituted lactone, a copolymer of lactones having different substituents, or a mixture of these.

The starting lactone may be any lactone compound having an ester linkage —CO—O— in its cyclic structure but may preferably be one containing at least 4 carbon atoms and represented by the following formula (I):

wherein n is an integer of 3 or larger, each of R's denotes a hydrogen atom, alkyl group, cycloalkyl group, alkoxy group or aryl group, and at least n+1 of the R's are hydrogen atoms. Suitable examples of the lactones may include substituted or non-substituted propiolactone, butyrolactone, δ-valerolactone and further large cyclic lactones.

A class of lactones specifically preferred in the present invention are ε-caprolactones represented by the following formula (II):

wherein each of R's denotes a hydrogen atom, alkyl group, cycloalkyl group, alkoxy group or aryl group with at least 5 R's being hydrogen atoms. Non-substituted ε-caprolactone with all R's being hydrogen is derived from 6-hydroxyhexanoic acid.

In addition to non-substituted ε-caprolactone, there may be suitably used in the present invention substituted ε-caprolactones, inclusive of monoalkyl-ε-caprolactones having substituents, such as mono-methyl and mono-isopropyl; dialkyl-ε-caprolactones having two alkyl substituents; ε-caprolactones having three or more alkyl substituents, such as trialkyl-ε-caprolactone and tetraalkyl-ε-caprolactone; methoxy-ε-caprolactone, ethoxy-ε-caprolactone; cycloalkyl-ε-caprolactones, such as cyclohexyl-ε-caprolactone; aryl-ε-caprolactone, such as phenyl-ε-caprolactone; and aralkyl-ε-caprolactones, such as benzyl-ε-caprolactone.

These non-substituted or substituted lactones may be polymerized singly or in mixture. The lactones may be polymerized by using one or more reaction initiators having at least one reaction site capable of opening the ring of a lactone ring in the presence or absence of a polymerization catalyst to obtain a linear or branched polyester of a desired molecular weight.

Suitable examples of the reaction initiator may include mono-functional initiators, such as alcohols and amines; and polyfunctional initiators, such as polyols, polyamines, aminoalcohols and vinyl polymers. More specifically, examples of mono-functional alcohols may include primary, secondary and tertiary aliphatic alcohols, such as methanol, ethanol, propanol, 1-butanol, 2-butanol and tertiary butanol; aromatic alcohols, such as benzyl alcohol; and alicyclic alcohols, such as cyclohexanol. Examples of the amines may include ethyl-, propyl-, n-butyl-and isobutyl-amines.

Further, examples of the di-functional initiators may include glycols represented by the formula: $HO(CH_2)_nOH$ (n=1-10), and glycols represented by the formula $HO(CH_2CH_2O)_n$ and $HO[CH(CH_3)CH_2O]_nH$ (n=1-100). Further examples of these or more functional initiators may include glycerol, trimethylolpropane, N-triisopropanolamine, erythritol, pentaerythritol, N,N,N',N'-tetrakis-(2-hydroxyethyl)ethylenediamine, dipentaerythritolglucose, starch and cellulose.

The polymerization of the lactone may be effected at an elevated temperature of 60° C. or higher and preferably in the presence of a catalyst for the purpose of promotion of the reaction.

The catalyst used for this purpose may suitably comprise an organic titanium compound or an organic compound or metal chelate compound of a metal, such as silver, lead, manganese, aluminum or magnesium. Specific examples thereof ma include tetrabutyl titanate, aluminum isopropoxide, and zinc borate.

The lactone polymer constituting the host polymer used in the present invention may desirably have a weight-average molecular weight of $10^4$ or above, preferably $2 \times 10^4 - 100 \times 10^4$, further preferably $5 \times 10^4 - 20 \times 10^4$, in view of the mechanical strength of the resultant solid solution.

The lactone polymer constituting the host polymer can have a wide range of melting point depending on the kind and degree of polymerization thereof but may desirably have a melting point of 50° C. or higher in order to provide a device at room temperature. The lactone polymer may be either a homopolymer or a copolymer. In case of a copolymer, the copolymer may desirably contain at least about 60 mol %, preferably at least about 80% of recurring ester units obtained by ring-opening of the lactone.

The host polymer used in the present invention may alternatively be a copolymer nylon which has at least two types of amide linkages each defined by a combination of two units sandwiching an amide bond (—CONH—) and may be obtained through copolymerization of a mixture of starting monomers providing two or more homonylons. Thus, an ordinary homonylon, such as nylon-6 or nylon-6,6 characterized by a single type of amide linkage may be excluded. This is because a copolymer nylon has a lower crystallinity than a homonylon such as nylon-6 or nylon-6,6 and therefore shows a good mutual solubility with an organic guest compound to provide a uniform and flexible solid solution excellent in mechanical strength which cannot be realized by such a homo-nylon having a higher crystallinity.

Examples of monomers providing the copolymer nylon to be used in the present invention may include: ε-caprolactam (starting material of nylon-6), 11-aminoundecanoic acid (material of nylon-11), ω-laurolactam (material of nylon-12), hexamethylenediamine/adipic acid salt (material of nylon-66), hexamethylenediamine/sebacic acid salt (material of nylon-610), and hexamethylenediamine/lauric acid salt (material of nylon-612).

Specific examples of the copolymer nylon may include ternary copolymer of nylon 6/66/610 formed from ε-caprolactam, nylon 66 salt and nylon 610 salt, and a quarternary copolymer of nylon 6/66/12/610 formed from ε-caprolactam, nylon 66 salt, ω-laurolactam and nylon 610 salt.

The copolymer nylon constituting the host polymer used in the present invention may desirably have a weight-average molecular weight of 5000 or above, preferably $1\times10^4$–$30\times10^4$, in view of the mechanical strength of the resultant solid solution.

The lactone polymer or copolymer nylon used as the host pollymer of the present invention can be mixed with a polymer compatible therewith in order to control the melting point, the glass transition point or crystallinity relating to optical transmittance of the host polymer. For example as a lactone polymer per se has a relatively low melting point on the order of 50°–70° C., it is practically useful to elevate the melting point. Examples of the polymer used for this purpose in combination with the copolymer nylon may include acrylic resin, butyral resin, styrene copolymer, polyethylene oxide resin, polyvinylidene fluoride resin, and also homonylons corresponding to the homopolymers of monomers constituting the copolymer nylon.

Examples of the polymer to be mixed with the lactone polymer may include acrylic resin, vinyl chloride resin, butyral resin, styrene copolymer, polyethylene oxide resin, and vinylidene fluoride polymer. It is also possible to add a polymer or low-molecular weight compound having a group, such as isocyanate group, reactive with hydroxyl group of the lactone polymer, in order to cause crosslinking of the solid solution or to more firmly fix the guest compound in the solid solution.

When blended with another polymer, the lactone polymer or copolymer nylon may preferably constitute at least 20 wt. %, preferably at least 50 wt. %, of the resultant host polymer mixture. It is also possible to use the lactone polymer and copolymer nylon in combination.

Next, the guest compound used in the guest-host type solid solution of the present invention is an organic compound having both an electron attractive group and an electron donative group and thus a charge-unsymmetrical electronic structure. The guest compound generally has a low molecular weight of about 1000 or below.

Examples of the electron donative group attached to the guest compound as described above may include: amino group, alkyl group (methyl, ethyl, isopropyl, n-propyl, n-butyl, t-butyl, sec-butyl, n-octyl, t-octyl, n-hexyl, cyclohexyl, etc.), alkoxy group (methoxy, ethoxy, propoxy, butoxy, etc.), alkylamino group (N-methylamino, N-ethylamino, N-propylamino, N-butylamino, etc.), hydroxyalkylamino group (N-hydroxymethylamino, N-(2-hydroxyethyl)amino, N-(2-hydroxypropyl)amino, N-(3-hydroxypropyl)amino, N-(4-hydroxybutyl)amino, etc.), dialkylamino group (N,N-dimethylamino, N,N-diethylamino, N,N-dipropylamino, N,N-dibutylamino, N-methyl-N-ethylamino, N-methyl-N-propylamino, etc.), hydroxyalkyl-alkylamino group (N-hydroxymethyl-N-methylamino, N-hydroxymethyl-N-ethylamino, N-hydroxymethyl-N-ethylamino, N-(2-hydroxyethyl)-N-methylamino, N-(2-hydroxyethyl)-N-ethylamino, N-(3-hydroxypropyl)-N-methylamino, N-(2-hydroxypropyl)-N-ethylamino, N-(4-hydroxybutyl)-N-butylamino, etc.), dihydroxyalkylamino group (N,N-dihydroxymethylamino, N,N-di-(2-hydroxyethyl)amino, N,N-di-(2-hydroxypropyl)amino, N,N-di-(3-hydroxypropyl)amino, N-hydroxymethyl-N-(2-hydroxyethyl)amino, etc.), mercapto group and hydroxy group.

On the other hand, examples of the electron attractive group may include: nitro group, cyano group, halogen atom (fluorine, chlorine, bromine), trifluoromethyl group, carboxyl group, carboxy ester group, carbonyl group and sulfonyl group.

It is desired that the organic guest compound has a second-order hyperpolarizability $\beta$ of at least about $0.4\times10^{-30}$ esu, preferably at least about $10\times10^{-30}$ esu. The second-order hyperpolarizability $\beta$ is experimentally obtained by electric field-induced second harmonic generation of a solution or a gas (Garito et al, Physical Review B, 28, (No. 12), 6766 (1983)).

Specific examples of the organic guest compound which may be suitably used in the present invention may include the following:

EXAMPLES OF THE ORGANIC GUEST COMPOUND

(1) $(H_2N)_2CO$

(2)

(3)

(4)

(5)

(6)

(7)

-continued

(8)

(9)

(10)

(11)

(12)

(13)

(14)

(15)  Y$^{\oplus 3}$(HCOO$^{\ominus}$)$_3$ (16)

(17)

| | R | R' | R'' | Z |
|---|---|---|---|---|
| (18) | H | H | H | CH |
| (19) | H | H | H | N |
| (20) | F | F | F | CF |

-continued

| | | | | |
|---|---|---|---|---|
| (21) | Me | H | H | CH |
| (22) | H | Me | H | CH |
| (23) | CF$_3$ | H | H | CH |
| (24) | H | CF$_3$ | H | CH |
| (25) | CN | H | H | CH |
| (26) | CH$_2$OH | H | H | CH |
| (27) | COOH | H | H | CH |
| (28) | H | OH | H | CH |
| (29) | NO$_2$ | H | H | CH |
| (30) | NO$_2$ | H | F | CH |
| (31) | NO$_2$ | H | Cl | CH |

(32)

(33)

(34)

(35)

(36)

(37)

(38)

(39)

(40)

(41)

(42)

(43)

(44)

(45)

(46)

(47) 
Sucrose

(48) 
Lactose

(49)

(50)

(51)

(52)

(53)

(54) 
1/4 $C_6H_6$

(55)

(56)

(57)

(58)

-continued

(59)

(60)

| | D | R | R' | Z |
|---|---|---|---|---|
| (61) | H₂N— | Me | H | CH ... (61a) |
| | | Cl | H | CH ... (61b) |
| (62) | MeNH— | Me | H | CH ... (62a) |
| | | Cl | H | CH ... (62b) |
| (63) | HO-N-H | COOH | H | CH ... (63a) |
| | | H | H | N ... (63b) |
| (64) | HO-N-H | H | H | CH ... (64a) |
| | | Me | H | CH ... (64b) |
| | | CF₃ | H | CH ... (64c) |
| | | H | CF₃ | CH ... (64d) |
| (65) | HO-piperidinyl-N— | H | H | CH ... (65a) |
| | | H | CF₃ | CH ... (65b) |
| | | CN | H | CH ... (65c) |
| (66) | NC-CH₂-N(Me)— | H | H | CH |
| (67) | NC-CH₂-N(Me)— | H | H | CH |
| (68) | HOOC-(CH₂)₃-NH— | H | H | CH |
| (69) | cyclohexyl-NH— | H | H | CH ... (69a) |
| | | H | H | N ... (69b) |
| (70) | Me₂N— | NHCOMe | H | CH ... (70a) |
| | | NHCOCF₃ | H | CH ... (70b) |
| (71) | pyrrolidinyl-N— | NHCOMe | H | CH |
| (72) | H₂N— | NHCOMe | H | CH |

-continued

| | | | | |
|---|---|---|---|---|
| (73) |  | H | H | N |
| (74) | Cl— | H | H | N ... (74a) |
| | | NO₂ | H | N ... (74b) |
| (75) | MeO— | H | H | N |
| (76) |  | H | H | CH ... (76a) |
| | | H | H | N ... (76b) |
| (77) |  | H | H | CH ... (77a) |
| | | H | H | N ... (77b) |
| | | Me | H | CH ... (77c) |
| | | CN | H | CH ... (77d) |
| (78) |  | H | H | CH |
| (79) |  | H | H | CH ... (79a) |
| | | CN | H | CH ... (79b) |
| | | H | OH | CH ... (79c) |
| | | H | H | N ... (79d) |
| (80) |  | H | H | CH |
| (81) | Ph—CH—CH—N— \ OH Me Me \ (+)pseudoephedrine | H | H | CH ... (81a) |
| | | H | H | N ... (81b) |
| (82) | Ph—CH—CH—N— \ OH CH₃ H \ (−)norpseudoephedrine | H | H | CH |
| (83) |  | H | H | N |
| (84) |  | H | H | N |
| (85) |  | H | H | N |

-continued

| | | | | |
|---|---|---|---|---|
| (86) [phenyl-CH(Me)-NH-] * | Me | H | CH | ... (86a) |
| | NO₂ | H | N | ... (86b) |
| | H | H | N | ... (86c) |
| | Me | H | N | ... (86d) |
| (87) [naphthyl-CH(R)-NH-] * | H | H | N | ... (87a) |
| | Me | H | N | ... (87b) |
| | NO₂ | H | N | ... (87c) |
| (86) PhNH-[pyrrolidine]-N- * | H | H | CH | |
| (89) [cyclohexyl with *NH- and *NH₂] | H | H | CH | |
| (90) [sugar-like ring HO, HO, OH, O, -NH-] | H | H | CH | |

In the above, Me denotes a methyl group, Ph denotes a phenyl group, and * denotes the location of an asymmetric carbon atom.

These guest compounds can be used in combination of two or more species.

The guest-host-type solid solution of the present invention may be prepared by dissolving the host polymer and the guest compound having both an electron attractive group and an electron donative group in a common solvent and then removing the solvent.

Suitable examples of the solvent may include toluene, benzene, methylene chloride, tetrahydrofuran and 1,4-dioxane, in case where the host polymer is the lactone polymer. Further, in case where the host polymer is the copolymer nylon, suitable examples of the solvent may include methanol, ethanol, propanol, toluene, benzene, methylene chloride and 1,4-dioxane.

As an alternative method, the solid solution of the present invention may be prepared by mixing the guest compound and the host polymer, heating the mixture into a molten phase and cooling the molten mixture to room temperature to form a uniform solid solution.

The guest compound may be contained in a proportion of generally at least about 15 wt. parts, preferably 15-90 wt. parts, per 100 wt. parts of the host polymer. The nonlinear optical effect of the solid solution is increased as the content of the guest component increases. The solid solution of the present invention comprising a lactone polymer or copolymer nylon as the host polymer retains good flexibility and excellent mechanical strength even at an increased amount of the guest compound.

The term "solid solution" used herein refers to a uniform solid mixture state which has been obtained through solidification from a mixture state wherein the guest compound and the host polymer are in a uniform fluid mixture at a molecular level either in a solvent or under heating. Such a solid solution state may for example be confirmed by absence of guest compound crystals alone in the mixture according to observation of the surface thereof by naked eyes or through a microscope. More specifically, such a solid solution state may be confirmed by the decrease in content of the guest compound present in the form of its crystal to 10% or below, preferably 5% or below, further preferably 1% or below, through quantitative analysis of the X ray-diffraction pattern of the solid solution.

The solid solution of the present invention can further contain other additives, such as quencher, antioxidant and ultraviolet absorber, so as to stabilize the organic guest compound.

The solid solution according to the present invention is a material showing nonlinear optical responses, such as hyperpolarization tensor characteristic inclusive of SHG and THG, optical phase conjugation, and optical bistabilization. Particularly with respect to SHG, it has been unexpectedly discovered that even a centrosymmetric crystal such as p-nitroaniline showing no SHG activity when used alone can develop a very large and uniform SHG activity when it is used as the guest compound and simply blended with the lactone polymer or copolymer nylon. One possible reason for this phenomenon is considered to be that the lactone polymer or copolymer nylon exerts a strong intermolecular interaction on the guest compound t prevent the guest molecule from assuming centrosymmetry.

It has been heretofore known that the non-centrosymmetry of a crystal is essentially required in order to develop a second nonlinear optical effect but a compound having a higher polarization tends to assume centrosymmetry. For this reason, in order to preclude the centrosymmetry, it has been proposed, for example, to introduce a substituent group at a non-symmetrical cite. In the guest/host solid solution of the present invention, it is possible to apply even an organic guest compound having a centrosymmetrical crystallinity.

The solid solution of the present invention can be formed into a film and illuminated with laser light to form a harmonic by SHG or THG, which may be used for effecting a display. In this case, the solid solution of the present invention can provide a large scattered harmonic without requiring a pre-orientation under an electric field or magnetic field even when an organic guest compound having a centrosymmetrical crystallinity by itself.

On the other hand, the solid solution of the present invention can be formed into a waveguide film or fiber for utilizing SHG or THG of transmitted light. In this case, phase matching is required and accomplished by molecular orientation or alignment by means of an electric field, magnetic field, stretching, etc. More specifically, a film of the solid solution is heated to a temperature higher than the glass transition temperature Tg of the host polymer, preferably a temperature around the crystal dispersion temperature, and then cooled to below Tg while being subjected to an electric field, magnetic field or stretching. The cooling rate at this time may desirably be below 50° C./sec, preferably below 5° C./sec, whereby the molecular orientation of the organic guest compound is structurally fixed. The molecular orientation or alignment in the guest/host solid solution can be confirmed by X-ray diffraction analysis.

Further, stretching of the solid solution at a temperature below the melting point of the host polymer also provides an effective means for orienting the guest compound molecules. A device can be formed by utilizing such stretching for formation of a film or fiber of the solid solution.

Figure 1:
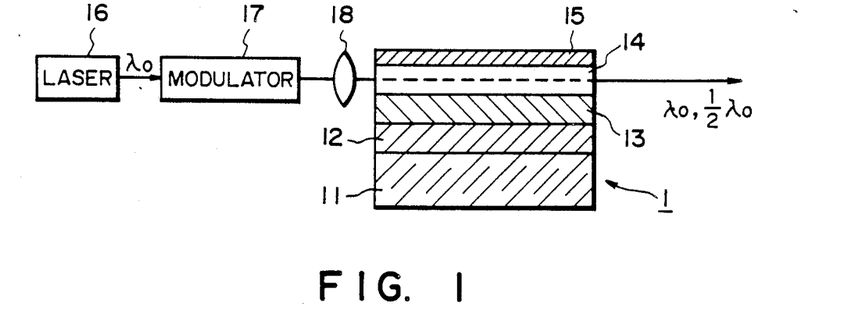
FIG. 1 is a schematic illustration of an example of an optical modulation system including a nonlinear optical element composed of a nonlinear optical material according to the present invention.

FIG. 1 schematically illustrates an example of an optical modulation system incorporating a nonlinear optical device 1 shown in the form of a section comprising therein a waveguide 14 formed of a solid solution according to the present invention. Referring to FIG. 1, the nonlinear optical device 1 comprises a substrate 11 of, e.g. glass, plastic, etc.; a lower electrode 12 formed of a conductor, such as ITO (indium-tin-oxide), tin oxide, indium oxide, gold, silver, copper or aluminum; a low-reflective index layer 13 in the form of a film of an organic material such as vinylidene fluoride-trifluoroethylene copolymer or an inorganic material such as $SiO_2$; the waveguide 14 of a nonlinear optical material according to the present invention in a thickness of, e.g., 0.1 to 10 microns, preferably 0.3 to 3 microns; and an upper electrode 15 of, e.g., aluminum.

In operation, a laser beam having a wavelength of $\lambda_0$ emitted from a laser source 16 after passing through an optical modulator 17 such as an optical switching element or an optical deflector and a condenser lens 18 is incident on the nonlinear optical material 1 to be converted into a second harmonic having a wavelength $\lambda_0/2$ for output.

Hereinbelow, the present invention is explained based on Examples.

EXAMPLE 1

An example of the solid solution of the present invention was prepared.

10 wt. parts of a lactone polymer represented by the following formula:

n = about 300 was mixed with 50 wt. parts of benzene and 2.5 wt. parts of p-nitroaniline, and the mixture was heated under stirring to cause dissolution. The thus formed uniform mixture solution was cast onto a glass substrate and heated to about 70° C. for evaporating the solvent to obtain an about 500 micron-thick film of a guest/host solid solution. The film of solid solution showed a mechanical strength and also a flexibility, thus requiring no particular care for handling.

[Synthesis of the above lactone polymer]

150 wt. parts of ε-caprolactone was mixed with 200 wt. parts of toluene, 5 wt. parts of ethylene glycol (reaction initiator) and 0.1 wt. part of phenylmagnesium iodide (polymerization catalyst), and the mixture was subjected to polymerization for 105 hours at 60°-70° C., thereby to obtain the lactone polymer having an average molecular weight of about $7 \times 10^4$. The melting point was 56° C.

[Measurement of SHG intensity]

Then, the SHG intensity of the solid solution film prepared above was measured in order to examine the nonlinear optical effect of the solid solution.

More specifically, the sample film was illuminated with an Nd-YAG laser beam (wavelength ($\lambda$) = 1.064 micron) at an output power of 3 mJ/pulse and a repetition frequency of 10 Hz, and the intensity of the resultant SHG light ($\lambda = 0.532$ micron) was measured through a photomultiplier.

The SHG intensity was also measured with respect to a film of the lactone polymer alone and the p-nitroaniline, and 60–100 microns particles of powdery urea crystal as a reference material. The thus measured SHG intensity of the samples are summarized in the following Table 1 as relative values with respect to the SHG intensity of the urea crystal as 1.

TABLE 1

| Sample Material | SHG intensity |
| --- | --- |
| p-nitroaniline (p-NA) | 0 |
| lactone polymer (polymer) | 0 |
| solid solution (p-NA/polymer = 25/100) | ≧25 |

As is shown in the above Table 1, p-nitroaniline alone or the lactone polymer alone showed no SHG but a strong SHG was observed from the gues/host-type solid solution.

Figure 2:
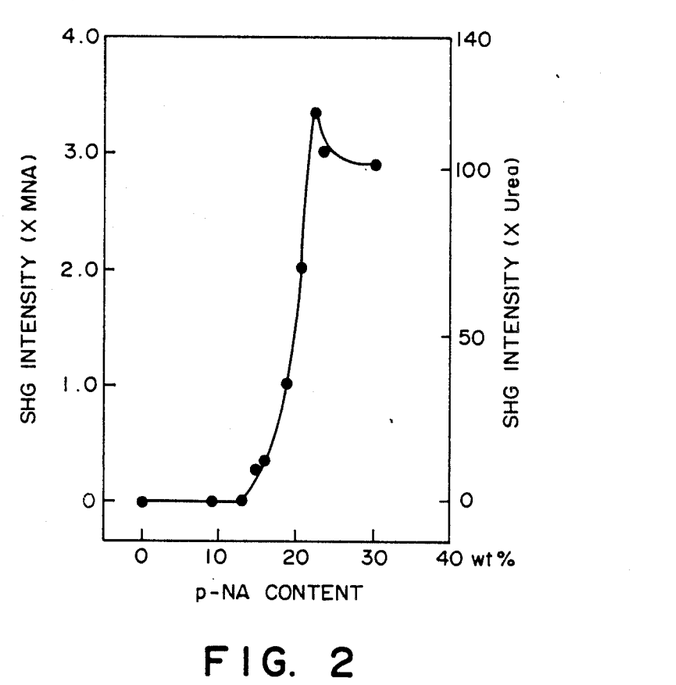
FIG. 2 is a graph showing the dependence of the nonlinear optical effect (SHG intensity) on p-NA content in a solid solution containing the p-NA.
Figure 3:
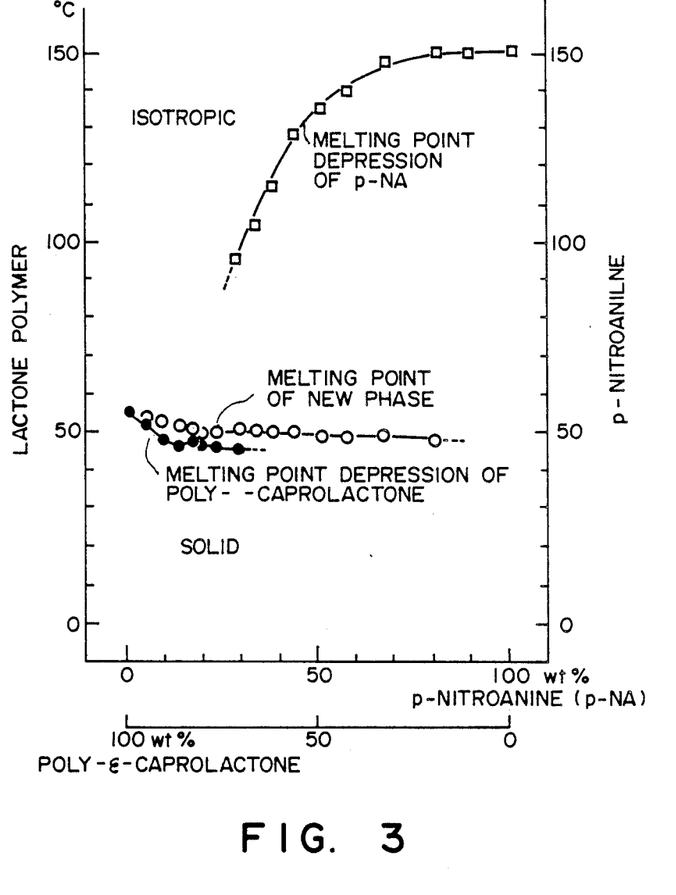
FIG. 3 is a phase diagram of an example of the solid solution according to the present invention.

FIG. 2 shows a typical change in SHG intensity of the above-described system with various p-nitroaniline contents in the total solid solution weight. Further, FIG. 3 shows a phase diagram of this system with varying proportions of the p-nitroaniline and the lactone polymer.

EXAMPLE 2

10 wt. parts of the lactone polymer, used in Example 1 was mixed with 2 wt. parts of N,N-dimethylamino-p-nitrobenzene as an organic guest compound in benzene solvent, and the solution was cast and heated for removal of the solvent to form an about 500 micron-thick film of guest/host-type solid solution. The film of solid solution showed a mechanical strength and also a flexibility, thus requiring no particular care for handling.

Then, the film of solid solution was illuminated with an Nd-YAG laser beam ($\lambda = 1.064$ micron), whereby an SHG intensity three times that of powdery urea crystal was observed by a photo-multiplier.

EXAMPLE 3

An alkyl-substituted lactone polymer with an average molecular weight of about $5 \times 10^4$ and a melting point of 52° C. was prepared from ε-methyl-ε-caprolactone in a similar manner as in Example 1. Then, 100 wt. parts of the lactone polymer and 20 wt. parts of N,N-dimethylamino-p-nitrobenzenen as a guest compound were mixed in benzene solvent, cast and heated for removal of the solvent to form an about 500 micron-thick film of guest/host solid solution.

The film of solid solution showed a mechanical strength and also a flexibility, thus requiring no particular care for handling.

The solid solution film was illuminated with an Nd-YAG laser beam ($\lambda = 1.064$ micron), whereby an SHG intensity about 20 times that of powdery urea was observed through a photomultiplier.

EXAMPLE 4

7 wt. parts of the lactone polymer prepared in Example 1, 3 wt. parts of butyral resin ("BL-S", available from Sekisui Kagaku K. K.) and 2.5 wt. parts of p-nitroaniline were dissolved in benzene under heating and stirring.

The thus prepared uniform mixture solution was cast onto a glass substrate and heated for removal of the solvent to form an about 800 micron-thick film of guest-/host solid solution. The solid solution film showed a better optical transmittance than the solid solution film of the lactone polymer and p-nitroaniline obtained in Example 1.

The solid solution film was illuminated with an Nd-YAD laser beam ($\lambda = 1.064$ micron), whereby an SHG intensity about 15 times that of powdery urea was observed through a photomultiplier.

EXAMPLE 5

8 wt. parts of the lactone polymer prepared in Example 1, 2 wt. parts of vinyl chloride resin ("DX-NL", available from Sumitomo Kagaku K. K.) and 2.5 wt. parts of p-nitroaniline were dissolved in benzene under heating and stirring.

The thus prepared uniform mixture solution was cast onto a glass substrate and heated for removal of the solvent to form an about 800 micron-thick film of guest-/host solid solution. The solid solution film showed a better optical transmittance than the solid solution film of the lactone polymer and p-nitroaniline obtained in Example 1.

The solid solution film was illuminated with an Nd-YAG laser beam ($\lambda = 1.064$ micron), whereby an SHG intensity about 18 times that of powdery urea was observed through a photomultiplier.

EXAMPLE 6

7 wt. parts of the lactone polymer prepared in Example 1, 3 wt. parts of polymethyl methacrylate with an average molecular weight of $12 \times 10^4$ (Mitsubishi Rayon K. K.) and 2.5 wt. parts of 2-methyl-4-nitroaniline were dissolved in benzene under heating and stirring.

The thus prepared uniform mixture solution was cast onto a glass substrate and heated for removal of the solvent to form an about 800 micron-thick film of guest-/host solid solution. The solid solution film showed a better optical transmittance than the solid solution film of the lactone polymer and p-nitroaniline obtained in Example 1.

The solid solution film was illuminated with an Nd-YAD laser beam ($\lambda = 1.064$ micron), whereby an SHG intensity about 15 times that of powdery urea was observed through a photomultiplier.

EXAMPLE 7

10 wt. parts of the lactone polymer prepared in Example 1 and 2 wt. parts of N,N-dimethyl-p-nitrobenzene as an organic guest compound were mixed and dissolved in benzene under heating. A glass substrate coated with a vapor-deposited aluminum film was further spin-coated with the above-prepared solution, followed by vaporization at 60°–80° C. to form an about 100 micron-thick uniform film, which was then further coated with an aluminum film by vapor-deposition to obtain a waveguide-type nonlinear optical element. The element was heated to 80° C. and then cooled to room temperature while being supplied with an electric field of 500 V/cm between the upper and lower aluminum electrodes.

The nonlinear optical element was illuminated with an Nd-YAG laser beam ($\lambda = 1.064$ micron) after focusing, whereby the generation of a second harmonic ($\lambda = 0.532$ micron) was observed through a photomultiplier.

EXAMPLE 8

10 wt. parts of the lactone polymer prepared in Example 1 and 2.6 wt. parts of p-nitroaniline as an organic guest compound were mixed and dissolved in benzene under heating, followed by casting and heating for removal of the solvent to form an about 400 micron-thick film of guest/host-type solid solution, which was then stretched at room temperature into a length of about 5 times.

The resultant stretched film was sandwiched between a pair of glass substrates and illuminated with an Nd-YAG laser beam ($\lambda = 1.064$ micron) so that it polarization plane was in parallel with the stretched direction, whereby the generation of an optical second harmonic was observed through a photomultiplier.

EXAMPLE 9

A solid solution according to the present invention was prepared in the following manner.

10 wt. parts of a 6/66/12/610 quaternary copolymer nylon ("CM 8000", available from Toray K. K.) was mixed with 50 wt. parts of ethyl alcohol and 2.5 wt. parts of p-nitroaniline, and the mixture was heated to 65° C. under stirring for dissolution.

The above-prepared uniform mixture solution was cast onto a glass substrate and heated to 60° C. for removal of the solvent to form an about 300 micron-thick film of uniform guest/host-type solid solution.

The solid solution film showed a mechanical strength and also a flexibility, thus requirinng no particular care for handling.

Then, the film was subjected to measurement of SHG intensity in the same manner as in Example 1. The results are shown in the following Table 2.

TABLE 2

| Sample material | SHG intensity* |
| --- | --- |
| p-nitroaniline (p-NA) | 0 |
| p-NA/copolymer nylon (= 25/100 (wt/wt)) | 15 |

*Relative intensity with respect to powdery urea as 1.

As shown in Table 2, the guest compound (p-nitroaniline) alone showed no SHG, but the guest/host solid solution of p-nitroaniline in the copolymer nylon showed a strong SHG intensity.

EXAMPLE 10

10 wt. parts of the copolymer nylon used in Example 9 was mixed with 2 wt. parts of N,N-dimethylamino-p-nitrobenzene as an organic guest compound in ethanol solvent, and the solution was cast and heated for removal of the solvent to form an about 100 micron-thick film of uniform guest/host solid solution.

Then, a glass substrate coated with a vapor-deposited aluminum film was further spin-coated with a solution of the solid solution dissolved in benzene, followed by vaporization of the benzene at 60° C. to form a uniform film, which was then further coated with an aluminum film by vapor deposition to obtain a waveguide-type nonlinear optical element. The element was heated to 80° C. and then cooled to room temperature while being supplied with an electric field of 500 V/cm between the upper and lower aluminum electrodes. The nonlinear optical element was illuminated with an Nd-YAG laser beam (λ=1.064 microns) after focusing, whereby the generation of a second harmonic (λ=0.532 micron) was observed through a photomultiplier.

EXAMPLE 11

10 wt. parts of the copolymer nylon used in Example 9 was mixed with 2 wt. parts of 4-aminobenzonitrile as an organic guest compound in 100 wt. parts of ethanol solvent, and the solution was cast and heated for removal of the solvent to form an about 100 micron-thick film of uniform guest/host solid solution.

Then, a glass substrate coated with a vapor-deposited aluminum film was further spin-coated with a solution of the solid solution dissolved in benzene, followed by vaporization of the benzene at 60° C. to form a uniform film, which was then further coated with an aluminum film by vapor deposition to obtain a waveguide-type nonlinear optical element. The element was heated to 80° C. and then cooled to room temperature while being supplied with an electric field of 500 V/cm between the upper and lower aluminum electrodes. The nonlinear optical element was illuminated with an Nd-YAG laser beam (λ=1.064 microns) after focusing, whereby the generation of a second harmonic (λ=0.532 micron) was observed through a photomultiplier.

EXAMPLE 12

7 wt. parts of the copolymer nylon used in Example 9, 3 wt. parts of butyral resin ("BL-1", available from Sekisui Kagaku K. K.) and 2.5 wt. parts of p-nitroaniline were added to 50 wt. parts of ethyl alcohol and were stirred under heating to 65° C. for dissolution.

The above-prepared uniform mixture solution was cast onto a glass substrate and heated to 60° C. for removal of the solvent to obtain an about 300 micron-thick film of uniform guest/host solid solution.

The film of solid solution showed a mechanical strength and also a flexibility, thus requiring no particular care for handling.

Then, the film of solid solution was illuminated with an Nd-YAG laser beam (λ=1.064 micron), whereby an SHG intensity about 10 times that of powdery urea crystal was observed by a photomultiplier.

EXAMPLE 13

10 wt. parts of a 6/66/610 ternary copolymer nylon ("CM 4000", available from Toray K. K.) was mixed with 50 wt. parts of ethyl alcohol and 2.5 wt. parts of p-nitroaniline, and the mixture was heated to 65° C. under stirring for dissolution.

The above prepared uniform mixture solution was cast onto a glass substrate and heated to 60° C. for removal of the solvent to form an about 300 micron-thick film of uniform guest/host-type solid solution.

The solid solution film showed a mechanical strength and also a flexibility, thus requiring no particular care for handling.

The solid solution film was illuminated with an Nd-YAG laser beam (λ=1.064 micron), whereby an SHG intensity about 16 times that of powdery urea was observed through a photomultiplier.

As described hereinabove, according to the present invention, there is provided a guest/host-type solid solution comprising a host polymer of a lactone polymer or a copolymer nylon and an organic guest compound having both an electron attractive group and an electron donative group, which guest compound may be compatibly dissolved in the host polymer in a large amount. The solid solution is excellent in mechanical strength and processability and is suitable for formation into a device. Further, even an organic guest compound which has a large non-linearity but is by itself liable to form a centrosymmetrical crystal thus showing no SHG activity can develop a uniform and large SHG activity when it is blended with the host polymer to form the solid solution.

What is claimed is:

1. A non-linear optical material, comprising:
   a solid solution of an organic guest compound having both an electron attractive group and an electron donative group in a host polymer, said host polymer comprising:
   a lactone polymer obtained by polymerization of a monomer represented by the following formula:

wherein n is an integer of 3 or larger, wherein R is (i) an alkyl group, a cycloalkyl group, an alkoxy group or an aryl group, and (ii) at least (n+1) hydrogen atoms or
   a copolymer nylon obtained by copolymerization of at least two monomers selected from the group consisting of ε-caprolactam, 11-amino-undecanoic acid, ω-laurolactam, hexamethylenediamine/adipic acid salt, hexamethylenediamine/sebacic acid salt, and hexamethylenediamine/lauric acid salt;
   wherein at least 15 wt. parts of the guest compound is contained per 100 wt. part of the host polymer.

2. A non-linear optical material, comprising:
   a solid solution of an organic guest compound having both an electron attractive group and an electron donative group in a host polymer, said host polymer comprising:
   a lactone polymer obtained by polymerization of a monomer represented by the following formula:

wherein n is an integer of 3 or larger, wherein R is (i) an alkyl group, a cycloalkyl group, an alkoxy group or an aryl group, and (ii) at least (n+1) hydrogen atoms or
   a copolymer nylon obtained by copolymerization of at least two monomers selected from the group consisting of ε-caprolactam, 11-amino-undecanoic acid, ω-laurolactam, hexamethylenediamine/adipic acid salt, hexamethylenediamine/sebacic acid salt, and hexamethylenediamine/lauric acid salt;
   said non-linear optical material further comprising an additional polymer which is mutually soluble with the solid solution under heating or in a common solvent.

3. A non-linear optical device, comprising:
   a film of a non-linear optical material comprising:

a solid solution of an organic guest compound having both an electron attractive group and an electron donative group in a host polymer, said host polymer comprising:

a lactone polymer obtained by polymerization of a monomer represented by the following formula:

wherein n is an integer of 3 or larger, wherein R is (i) an alkyl group, a cycloalkyl group, an alkoxy group or an aryl group, and (ii) at least (n+1) hydrogen atoms or a copolymer nylon obtained by copolymerization of at least two monomers selected from the group consisting of ε-caprolactam, 11-amino-undecanoic acid, ω-laurolactam, hexamethylenediamine/adipic acid salt, hexamethylenediamine/sebacic acid salt, and hexamethylenediamine/lauric acid salt;

a laser light source for illuminating the film.

4. A non-linear optical material comprising:

a solid solution of an organic guest compound in a host polymer, said host polymer comprising:

a lactone polymer obtained by polymerization of a monomer represented by the following formula:

wherein n is an integer of 3 or larger, wherein R is (i) an alkyl group, a cycloalkyl group, an alkoxy group or an aryl group, and (ii) at least (n+1) hydrogen atoms or a copolymer nylon obtained by copolymerization of at least two monomers selected from the group consisting of ε-caprolactam, 11-amino-undecanoic acid, ω-laurolactam, hexamethylenediamine/adipic acid salt, hexamethylenediamine/sebacic acid salt, and hexamethylenediamine/lauric acid salt;

said guest compound being selected from the group consisting of:

$(H_2N)_2CO$,

-continued

23

-continued

Y⊕3(HCOO⊖)3,

H2PO4⊖·H2O

CH3OSO3⊖, wherein R is H, F, Me, CF3, CN, CH2OH, COOH or NO2, R' is H, F, Me, CF3 or OH, R" is H, F or Cl and Z is CH, N or CF,

24

-continued wherein D is

$H_2N-$,

MeN—,
 |
 H

-continued

Me₂N—,

H₂N—,

Cl—,

MeO—,

-continued

R is Me, Cl, COOH, H, CF₃, CN, NHCOMe, NHCOCF₃ or NO₂, R' is H, CF₃ or OH and Z is CH or N,

5. A non-linear optical material according to claim 1, wherein said host polymer comprises a lactone polymer having a weight average-molecular weight of $10^4$ or above.

6. A non-linear optical material according to claim 1, wherein said host polymer comprises a lactone polymer having a weight average-molecular weight of $2\times10^4$–$100\times10^4$.

7. A non-linear optical material according to claim 1, wherein said host polymer comprises a lactone polymer having a weight average-molecular weight of $5\times10^4$–$20\times10^4$.

8. A non-linear optical material according to claim 1, wherein said host polymer comprises a lactone polymer having a melting point of 50° C. or higher.

9. A non-linear optical material according to claim 1, wherein said host polymer comprises a copolymer nylon having a weight average-molecular weight of 5,000 or above.

10. A non-linear optical material according to claim 1, wherein said host polymer comprises a copolymer nylon having a weight average-molecular weight of $1\times10^4$–$30\times10^4$.

11. A non-linear optical material according to claim 2, wherein said host polymer comprises a lactone polymer having a weight average-molecular weight of $10^4$ or above.

12. A non-linear optical material according to claim 2, wherein said host polymer comprises a lactone polymer having a weight average-molecular weight of $2\times10^4$–$100\times10^4$.

13. A non-linear optical material according to claim 2, wherein said host polymer comprises a lactone polymer having a weight average-molecular weight of $5\times10^4$–$20\times10^4$.

14. A non-linear optical material according to claim 2, wherein said host polymer comprises a lactone polymer having a melting point of 50° C. or higher.

15. A non-linear optical material according to claim 2, wherein said host polymer comprises a copolymer nylon having a weight average-molecular weight of 5,000 or above.

16. A non-linear optical material according to claim 2, wherein said host polymer comprises a copolymer nylon having a weight average-molecular weight of $1\times10^4$–$30\times10^4$.

17. A non-linear optical material according to claim 2, wherein said additional polymer is selected from the group consisting of acrylic resin, vinyl chloride resin, butyral resin, styrene copolymer, polyethylene oxide resin, and vinylidene fluoride polymer.

18. A non-linear optical device according to claim 3, wherein said film has been oriented.

19. A non-linear optical device according to claim 3, which further comprises an electrode disposed on said film.

20. A non-linear optical device according to claim 3, wherein a low-reflective index layer is disposed on said film to form a laminate, and the laminate is disposed between a pair of electrodes.

21. A non-linear optical device according to claim 20, wherein said low-reflective index layer comprises vinylidene fluoride-trifluoroethylene copolymer or $SiO_2$.

22. A non-linear optical device according to claim 3, wherein said host polymer comprises a lactone polymer having a weight average-molecular weight of $10^4$ or above.

23. A non-linear optical device according to claim 3, wherein said host polymer comprises a lactone polymer having a weight average-molecular weight of $2\times10^4$–$100\times10^4$.

24. A non-linear optical device according to claim 3, wherein said host polymer comprises a lactone polymer having a weight average-molecular weight of $5\times10^4$–$20\times10^4$.

25. A non-linear optical device according to claim 3, wherein said host polymer comprises a lactone polymer having a melting point of 50° C. or higher.

26. A non-linear optical device according to claim 3, wherein said host polymer comprises a copolymer nylon having a weight average-molecular weight of 5,000 or above.

27. A non-linear optical device according to claim 3, wherein said host polymer comprises a copolymer nylon having a weight average-molecular wight of $1\times10^4$–$30\times10^4$.

28. A non-linear optical device according to claim 3, which comprises at least 15 wt. parts of the guest compound per 100 wt. parts of the host polymer.

29. A non-linear optical device according to claim 3, which further comprises an additional polymer which is mutually soluble with the solid solution under heating or in a common solvent.

30. A non-linear optical device according to claim 29, wherein said additional polymer is selected from the group consisting of acrylic resin, vinyl chloride resin, butyral resin, styrene copolymer, polyethylene oxide resin and vinylidene fluoride polymer.

31. A non-linear optical device according to claim 18, wherein said film has been oriented by stretching.

32. A non-linear optical material according to claim 4, wherein said host polymer comprises a lactone polymer having a weight average-molecular weight of $10^4$ or above.

33. A non-linear optical material according to claim 4, wherein said host polymer comprises a lactone polymer having a weight average-molecular weight of $2\times10^4$–$100\times10^4$.

34. A non-linear optical material according to claim 4, wherein said host polymer comprises a lactone polymer having a weight average-molecular weight of $5\times10^4$–$20\times10^4$.

35. A non-linear optical material according to claim 4, wherein said host polymer comprises a lactone polymer having a melting point of 50° C. or higher.

36. A non-linear optical material according to claim 4, wherein said host polymer comprises a copolymer nylon having a weight average-molecular weight of 5000 or above.

37. A non-linear optical material according to claim 4, wherein said host polymer comprises a copolymer nylon having a weight average-molecular weight of $1\times10^4$–$30\times10^4$.

* * * * *

UNITED STATES PATENT AND TRADEMARK OFFICE
CERTIFICATE OF CORRECTION

PATENT NO. : 4,981,614

DATED : January 1, 1991

INVENTOR(S) : TAKESHI MIYAZAKI ET AL.

It is certified that error appears in the above-identified patent and that said Letters Patent is hereby corrected as shown below:

IN THE DRAWINGS:
SHEET 2 OF 2

FIG. 3, "POLY- -CAPROLACTONE" SHOULD READ
    --POLY-ε-CAPROLACTONE--;
    "p-NITROANINE" should read --p-NITROANILINE--; and
    "p-NITROANILNE" should read --p-NITROANILINE--.

COLUMN 4

Line 22, "ma" should read --may--.
    Line 55, "homo-nylon" should read --homonylon--.

COLUMN 5

Line 10, "pollymer" should read --polymer--.

COLUMN 6

Line 14, "et al," should read --et al.,--.

COLUMN 14

Line 31, "t" should read --to--.
    Line 40, "cite." should read --site.--.

COLUMN 16

Line 29, "gues/host-type" should read
    --guest/host-type--.

UNITED STATES PATENT AND TRADEMARK OFFICE
CERTIFICATE OF CORRECTION

PATENT NO. : 4,981,614
DATED : January 1, 1991
INVENTOR(S) : TAKESHI MIYAZAKI ET AL.

It is certified that error appears in the above-identified patent and that said Letters Patent is hereby corrected as shown below:

COLUMN 18

Line 20, "it" should read --its--.
   Line 38, "requirinng" should read --requiring--.

COLUMN 20

Line 39, "part" should read --parts--.

COLUMN 30

Line 29, "wight" should read --weight--.

Signed and Sealed this

Sixth Day of October, 1992

*Attest:*

DOUGLAS B. COMER

*Attesting Officer*   Acting Commissioner of Patents and Trademarks